Nov. 24, 1970   W. C. GRAYSON   3,541,717
METHOD OF DIRECTING FISH SEINING OPERATIONS
Filed June 7, 1968   3 Sheets-Sheet 1

INVENTOR.
WILBUR C. GRAYSON
BY William K. Kinnear
ATTORNEY

Nov. 24, 1970  W. C. GRAYSON  3,541,717
METHOD OF DIRECTING FISH SEINING OPERATIONS
Filed June 7, 1968  3 Sheets-Sheet 2
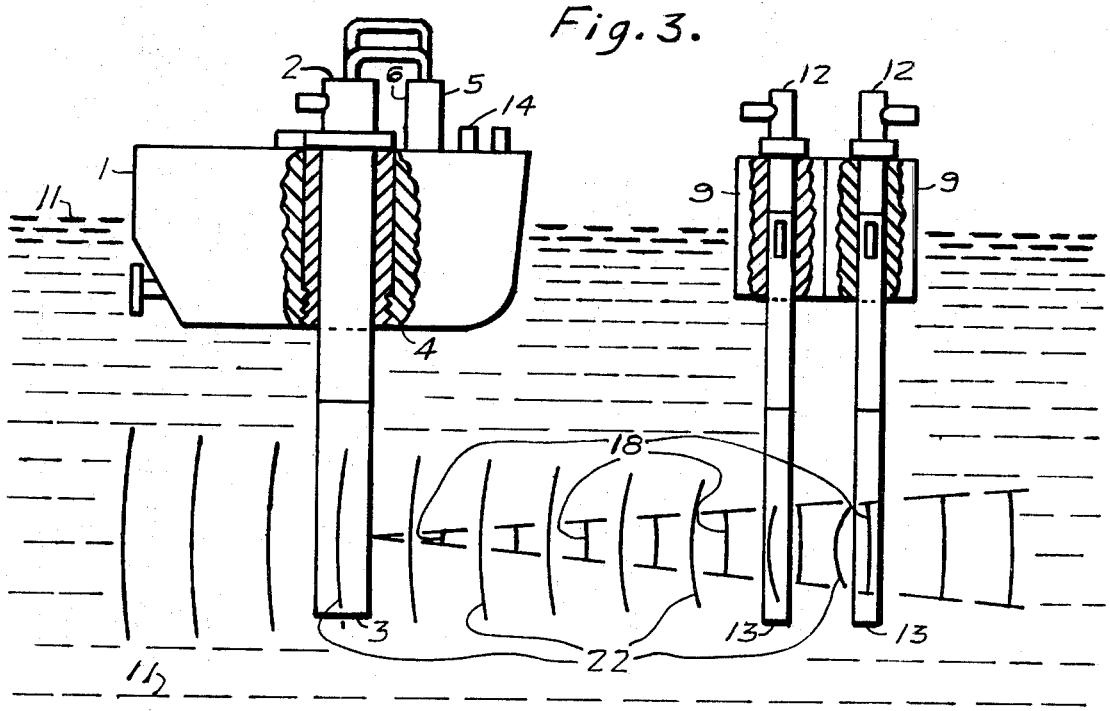
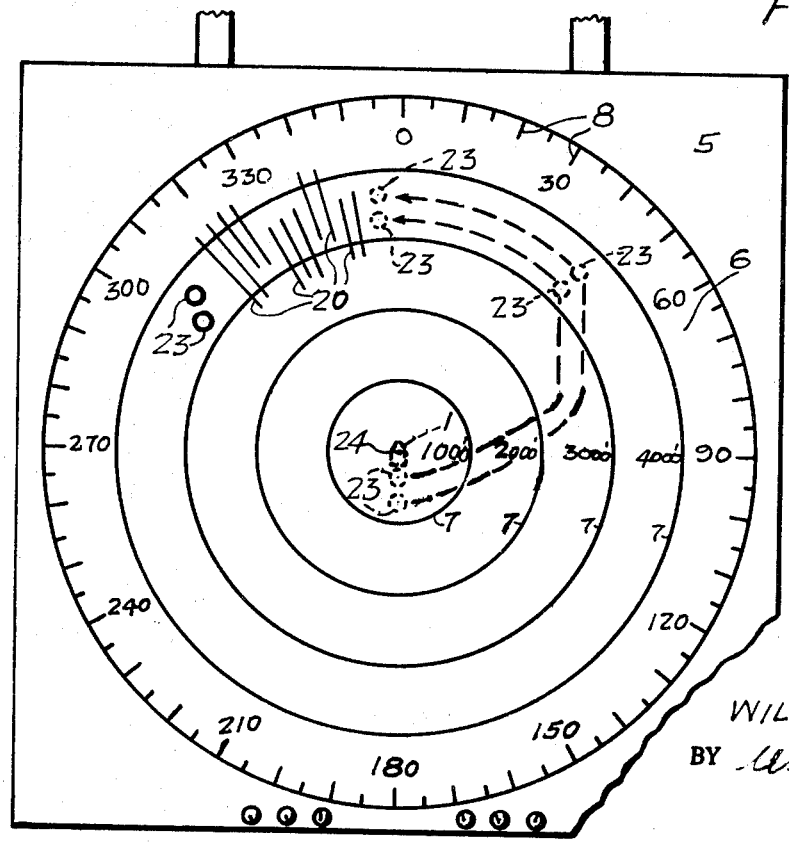
INVENTOR.
WILBUR C. GRAYSON
BY William E. Kinnear
ATTORNEY INVENTOR.
WILBUR C. GRAYSON
BY William E. Kinnear
ATTORNEY

United States Patent Office 3,541,717
Patented Nov. 24, 1970

3,541,717
METHOD OF DIRECTING FISH SEINING OPERATIONS
Wilbur Charles Grayson, 3315 12th St.,
Port Arthur, Tex. 77640
Filed June 7, 1968, Ser. No. 735,437
Int. Cl. A01k 73/12
U.S. Cl. 43—4.5                                     4 Claims

ABSTRACT OF THE DISCLOSURE

In fish seining operations a sonar unit on a radio equipped search boat is operated to locate and display on a viewing unit the position of a body of fish. A transponder unit on a purse boat is operated to display on the viewing unit of the search boat its position relative to the body of fish. The radio on the search boat is utilized to direct the purse boat to the body of fish and the subsequent steps in the seining operations.

---

This invention relates to the method of the utilization of a marine search boat and one or more purse boats preferably two purse boats carrying purse type seine for catching fish therein which are located by the sonar equipped search boat for locating the fish and the like or other dense bodies or objects in the water in which said boats are cruising.

An object of the invention is to provide a method of the character described whereby the display means of the sonar unit on the search boat viewed by the operator thereof utilizes the relationship of the relative positions of the purse boats in the course of travel to perform the seining operations to the relative position of the fish that are continuously recorded and shown on said display means to enable the operator of the search boat to direct by means of radio communication to the purse boats through the operators thereof the correct course of travel and position with respect to the location of the fish preparatory to commencing fish seining operations to catch the fish in the seine.

Another object of the invention is to provide a method of the character described whereby the operator of the display means on the search boat may read and interpret the images or characters recorded on said display means to determine the relative positions of the purse boats to the fish in the water to enable the operator to select the most advantageous time to commence lowering the seine into the water from the purse boats to encircle the fish to catch the fish in the net.

Figure 1:
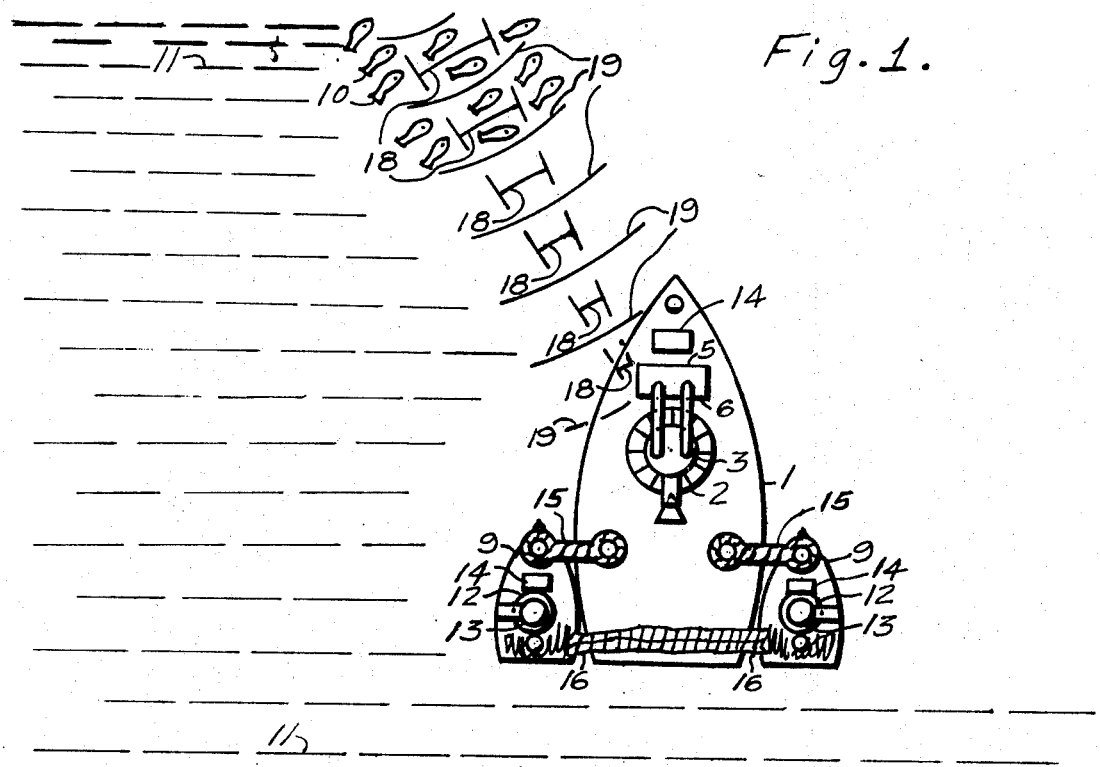
Figure 2:
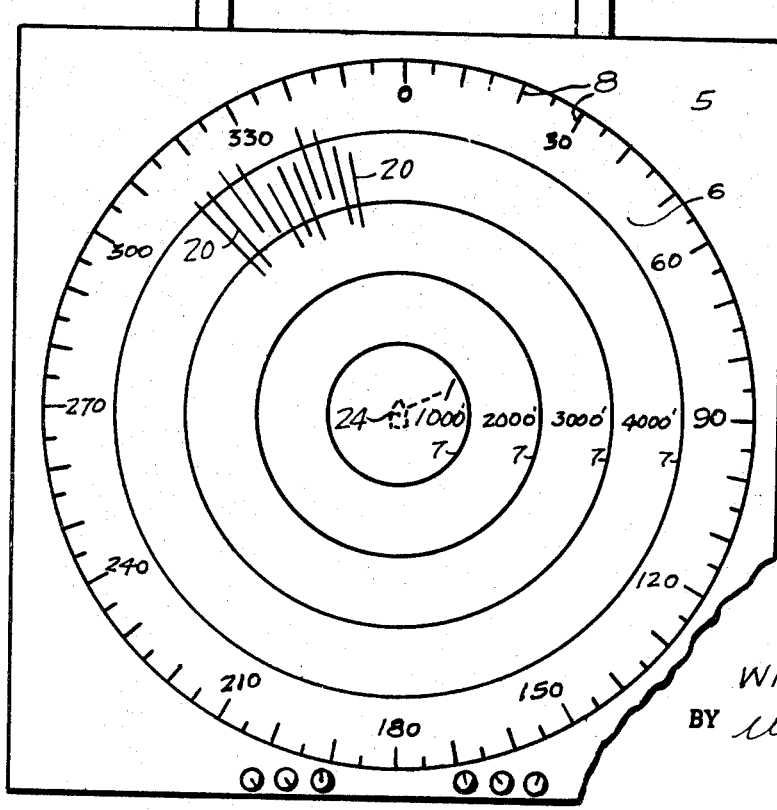
Figure 4:
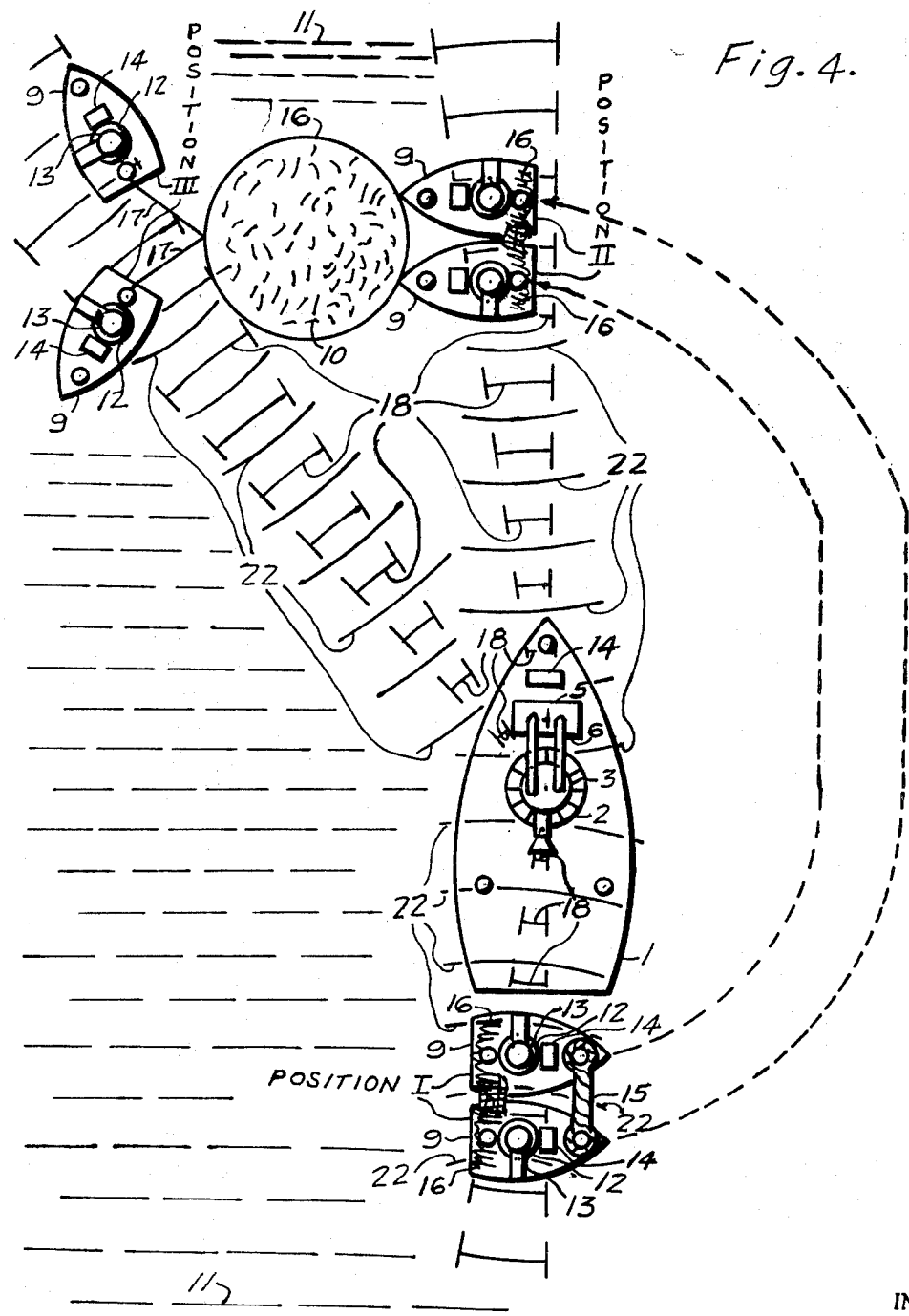

These and other objects of the invention will in part be obvious and will in part be more fully disclosed in the specification, the drawings of which illustrate one embodiment of the invention, in which:

FIG. 1 is a top plan view of a search boat with two purse boats suspended on each side and near the rear thereof with diagram bordered curved arc lines spaced apart in outgoing pattern illustrating the narrow beamed outgoing sonic impulses generated by the sonar unit in scanning reciprocating movement in front of search boat which has located a school of fish between 315 and 350 degrees on the calibrated face of the display means at the range of approximately 2800' to 4200' from the center of the sonar unit on the search boat reckoning from same being located at the center of the face of the display means as shown in FIG. 2 of the drawings, and, the reversed spaced lines reflected off the bodies of the fish as illustrating the returning reflected sonic impulses transmitted through the water coming back to the transducer connected to the sonar unit from reflected sonic impulses generated by the outgoing narrow beamed sonic impulses rebounding off the fish and said returning reflected sonic impulses being received by the sensing means of the transducer depending into the water from the connected sonar unit on the search boat and the record of the reflected impulses shown as lighted or illuminated images or characters on the display means represented as spaced radial lines in the area on the calibrated face of the display means as shown in FIG. 2 of the drawings;

FIG. 2 is a top plan view of the calibrated face in degrees for direction and range or distance in feet measurements of the display means between 315 and 350 degrees in direction and at the range or distance of approximately 2800' to 4200' as shown on the cathode ray tube type display means used to illustrate one form of the invention;

FIG. 3 is a side view partly sectional showing the search boat sending out by sonar through connected sensing means in a transducer depending into the water from the search boat outgoing sonic impulses to be received by the sensing means of transducers depended into the water from transponders of the purse boats by the alternating sweeping scanning of the water to either side of the search boat in search of bodies of fish contacted by said outgoing sonic impulses and showing the returning reflected sonic impulses through the sensing means of the transducers from the transponders of the purse boats and recorded as images or characters on the calibrated face of the cathode ray tube type display means connected to said sonar unit on said search boat to enable the operator of the search boat to direct the operators of the purse boats by radio communicating means the location of the fish, to direct the course of travel of the purse boats into the correct position juxtaposition of the fish, to direct the time for lowering the seine folded on the purse boats into the water, to direct the time to commence circling and closing of the seine, and to direct the course of travel in circling about the fish and closing the seine to catch the fish;

FIG. 4 is a top plan view showing the sonar equipped sonar search boat and the launched pair of purse boats tied together during the directed manuevering to a position in front of the school of fish, untying of the purse boats from each other, the timed lowering and circling movement with the seine lowered from the purse boats, and the closing of the seine about the school of fish for catching the fish; and, FIG. 5 is a top plan view showing the recorded diagrammatic view of the location of the fish indicated by short spaced radial lines representing illuminated images on the circular face of the cathode ray tube type display means and the short broken lines indicating the course of travel of the purse boats in proceeding from launched Position I behind the search boat to a Position II in front of the school of fish, and showing Position III of the pair of purse boats after circling in opposed directions around the school of fish with the seine and the crossing over of the cork line on top of the seine and the lead lines at the bottom of the seine which drawn lead lines purse the seine at its bottom and holding the lines fast to keep the seine closed and pursed in closed position.

The invention will be better understood from a more detailed description thereof, reference being had to the accompanying drawings wherein like numeraled parts therein denote like numeraled parts herein.

The numeral 1 denotes a marine type surface search boat equipped with sonar unit 2 having depending transducer 3 extending down through the bottom 4 of the search boat 1 and into the water 11 for transmitting outgoing sonic impulses 18 and receiving sonic impulses 22 sent and received through the sensing means thereof and the returning reflected sonic impulses 22 recorded as illuminated images or characters on the calibrated face 6 of the cathode ray tube type display means 5. The sonar unit 2 has connected thereto cathode ray tube type display means 5, transducer 3 on the search boat 1 and transponders 12—12 and transducers 13—13 on the pair of purse boats 9—9 and each piece of said electrically operated equipment are separately well known as illustrated and disclosed in the 1967 Catalogue of Edo Western Corporation of Salt Lake City, Utah which equipment is referred to herein solely for the purpose as examples of known equipment none of which are combined or used in the manner or mode of operations disclosed herein in my method invention. The calibrated face 6 of the display means 5 shows lines spaced as circumscribed circles extending outward from the center 24 of said face 6 which circles are calibrated in feet to show the distance from center where sonar unit is positioned on center of face 6 whereby the distance from center of the sonar on the search ship to any object in the water such as a school of fish 10 can be reckoned as the distance of the fish from the search ship. The numbered degree lines 8 and unnumbered degree lines therebetween all marked off around the outer periphery of the face 6 of the display means 5 make up the 360 degrees of the circular face 6 so that the direction of any object located in the water by the sonar unit can be readily read by the operator thereof for quick transmission of such information to the operators of the purse boats 9—9 of the location of the fish bodies 10 in the water both as to distance and direction. The sonar unit 2 is used to scan the water in alternating oscillating reciprocal movements to locate schools of fish or other objects such as the transducers 13—13 of the purse boats 9—9 and recording their relative positions on the face 6 of the display means 5 so that precise directions may be communicated by the operator of the search boat 1 to direct the operators of the pair of purse boats 9—9 of the time, manner, place to commence and complete the seining operations to catch the fish in the seine lowered and closed about the fish payed off from the purse boats in circling and closing the seine about the fish to catch the fish in the seine.

The pair of purse boats 9—9 are normally carried by the search boat 1 prior to locating the fish 10 which search boat 1 is a large ocean going vessel with considerable tonnage carrying capacity for storing the fish when caught and is equipped with electrically operated sonar unit 21 transducer 3, cathode ray tube type display means 5 with calibrated face 6 and two-way radio communicating means 14 of the motor driven type vessel for long voyages. The pair of purse boats 9—9 are quipped with transponders 12—12 with connected transducers 13—13 depending into the water 11 and two radio communicating means 14 with the purse type seine 16 folded equally on the after deck of each of said purse boats so that the middle of the seine spans the distance across from one purse boat to the other purse boat as they travel tied together with rope or line 15 so that the middle of the seine 16 is lowered first when the purse boats are untied by rope 15 as the purse boats begin their circling movement of the school of fish and the seine is payed off until the fish are completely surrounded and then one end of the seine is held by one purse boat by its top float line 17—17 and the other end of the float line 17—17 is crossed over and held by the other purse boat in closing the seine about the school of fish. Also the lead line (not shown) at the bottom of the seine 16 is pursed to close the bottom of the purse seine 16 to contain the fish within the seine 16.

In the conducting of the seining operation per set after the launching the purse boats 9—9 by the search boat 1 shown in Position I in FIG. 4 of the drawings, the purse boats are tied together with rope or line 15 and the operators of the purse boats are directed by radio communication means 14 the course to travel to arrive at Position II in front of the school of fish 10 as shown in FIG. 4 of the drawings, and then directs the purse boat operators of the time to commence lowering the seine 16 from Position II of the purpose boats as shown in FIG. 4 of the drawings, then to direct the time to begin circling and the time to close the purse seine 16 as shown in Position III of FIG. 4 of the drawings in order to secure the fish in the seine 16 for catching the fish. The two-way radio communicating system indicated at 14 on the search boat and the pair of purse boats is any of well known type such as that shown and described in the 1967 Catalogue CMCA Series of transistorized FM or FM-AM type radio communicating two-way radio manufactured by Radio Corporation of America which is referred to for the purpose of identifying a well known two-way radio communicating system.

In the operation of my method the sonar unit 2 sends out preferably timed outgoing narrow beamed sonic impulses 18 indicated in FIGS. 1, 3, and 4 of the drawings as progressively curved concaved segments of expanding diameter circles interrupted at the ends of the segments of their respective portions of circles by progressive spaced diverging lines at the ends of said segments to indicate that the outgoing sonic impulses 18 are narrow beamed and generated by the sonar unit 2 into the water 11 through the sensing means of the transducer 3 depending into the water 11 and the upper portion of said transducer 3 is connected to said sonar unit 2 on the search boat 1. Scanning the water with narrow beamed sonic outgoing impulses 18 with reciprocating sweeps of the water 11 up to 60 degrees to either side of the front of the search boat 1 is preferred to locate and find a school of fish such as the menhadden type for commercial purposes, or, for edible school fish or the like. However, it is to be understood that alternating sonic impulses on narrow or wide beam or sonic impulses radially outgoing up to 360 degrees from the sensing means of the transducer 3 may be sent from the sonar unit 2, or used in practicing my method of locating fish and recorded as reflected images or characters as illuminated lines or areas on the calibrated face 6 of the display means 5 as fleeting images during the reciprocating sweep of the water through the outgoing sonic impulses 18 and received reflected sonic impulses 22 after the fish are encountered with the sonic impulses and reflected back and received by the sensing means of the transducer 3 connected to said sonar unit and display means, or, a graphic display means may be used to record the returning reflected sonic impulses 22, all to the end that the operator of the search boat may fix the direction and distance of the fish and the length of the school of fish from the search boat 1 using the center 24 on the face of the display means 5 as the center of the sonar unit 2 as shown on the face 6 of the calibrated display means 5 as shown in FIGS. 2 and 5 of the drawings. The outgoing sonic impulses 18 upon reaching the bodies of the fish 10 such as large bodies of school fish an incoming returning reflected sonic impulses 22 are generated from the rebound of the outgoing sonic impulses 18 upon encountering the bodies of the fish 10 which reflected incoming sonic impulses 22 which travel back through the water 11 as the media of travel for said sonic impulses and is received by the sensing means in the transducer 3 connected to the electrically operated sonar unit 2. The said incoming convex returning sonic impulses 22 are recorded on the calibrated face 6 of the cathode ray tube type display means 5 as lighted or illuminated lines 20 which the operator of the search boat learns to associate same by the fact that such lighted or illuminated lines 20 are returning reflected incoming sonic impulses 22 generated from the outgoing sonic impulses 18 after they have encountered the bodies of the fish 10 and are rebounding or reflecting from the bodies of the fish 10 as a mass which indicates large numbers of school fish or the like have been located. The sensing means of the transducers 13—13 are depended into the water 11 from the transponders 12—12 of the purse boats 9—9 and which sensing means of said transducers 13—13 of the purse boats receive the outgoing sonic impulses 18 generated from the sonar unit 1 through the sensing means of the transducer 3 after the purse boats 9—9 have been launched into the water 11 from the search boat 1. The sensing means of the purse boats transducers 13—13 will cause the transponders 12—12 of the purse boats to relay the outgoing sonic impulses 18 received by the sensing means of the transducers 13—13 of the purse boats depended into the water 11 and relayed by the sending means of said transponders 12—12 back through said sensing means of said transducers 13—13 and received by the sensing means of the transducer 3 of the search boat 1 and recorded as lighted or illuminated images or characters 23 as fleeting images or characters traversing the course of travel of the purse boats on the face 6 of the cathode ray tube type display means 5 as shown in FIG. 5 of the drawings. Thus, the operator of the search boat can determine at all times the relative positions of the fish 10 and the purse boats 9—9 to enable the operator of the search boat by two-way FM-AM or FM radio communicating systems indicated at 14 on the search boat and each of the purse boats in order to direct the operators of the purse boats 9—9 the course and distance to travel to approach the fish as shown on the calibrated face 6 of the cathode ray tube connected to the sonor unit 2 and thus direct the time and place to commence lowering the middle of the seine 16 off the purse boats into the water 11 preferably in front of the school of fish of a sufficient distance according to the specie of the fish and their speed of travel, ordinarily school fish such as menhadden an approximate distance of 150 feet is sufficient. The seine is folded in layers on the after deck of the respective purse boats 9—9 and after the purse boats are launched into Position I astern the search boat 1 a rope or line 15 is used to keep the two purse boats 9—9 side by side until the purse boats are directed to Position II in front of the school of fish 10 at which time the operators of the purse boats 9—9 are directed by radio means by the operator of the search boat 1 to commence lowering the seine 16 beginning from the middle thereof into the water 11 to commence the seining operations, then directed to circle around the school of fish 10 sweeping around the outer periphery of the school of fish 10 and thence directing the operators of the purse boats to converge inwardly to bring the respective ends of the seine 16 tied to each purse boat respectively and meeting to cross over the lines 17—17 of the float line on top of the seine 16 and lead line (not shown) but extend along the bottom of the seine for making same sink into the water easily and thus closing the ends of the seine 16 about the fish 10 and pulling on the lead line to purse the bottom of the seine 16 and thus net the fish 10 completely within the seine 16. The lead line (not shown) of the seine 16 is of usual construction and is threaded through loops along the bottom edge of the seine so that upon pulling on the float lines 17—17 on top edge of seine 16 and the lead line at the same time the fish 10 are completely trapped within the seine to complete the catching of the fish in the seine. Then hardening of the seine is done by the search boat coming along side of seine 16 in juxta-position to the Position II of the purse boats as shown in FIG. 4 of the drawings and the seine 16 is folded onto the after decks of the purse boats in gathering fashion to cause the fish 10 to be packed so-to-speak in less area and by the use of the well known suction hose sucked into the compartments of the search boat 1 for storage.

It is obvious that many changes may be made in equivalent equipment to accomplish my method shown, described and claimed herein without departing from the spirit and scope of the invention.

Having thus illustrated and described the invention, what I claim as new and desire to secure by Letters Patent is:

1. The method of locating and directing fish seining operations in water by utilizing a radio equipped search boat provided with an electrically operated sonar unit including a submerged transducer and a viewing unit, and a radio equipped purse boat provided with an electrically operated transponder unit, comprising the steps of (1) operating the sonor unit on the search boat to locate and display on the viewing unit the position of a body of fish in the water, (2) operating the transponder unit on the purse boat to display on the viewing unit of the search boat the position of the purse boat relative to the body of fish, (3) directing the purse boat by radio to the location of the body of fish while continuously displaying the relative positions thereof on the viewing unit, and (4) directing the purse boat by radio when to commence the seining operations.

2. The method of claim 1 and including the step of (5) directing the purse boat, by radio, the time and place to lower the seine and encircle the body of fish displayed on the viewing unit.

3. The method of claim 2 and including the step of (6) directing the purse boat, by radio, the course of travel in encircling the body of fish with the seine from information displayed on the viewing unit.

4. The method of claim 3 and including the step of (7) directing the purse boat, by radio, the time and location to complete the closing of the seine about the body of fish from information displayed on the viewing unit.

References Cited

UNITED STATES PATENTS 2,788,509  4/1957  Bolzmann _____ 43—17.1 X
3,061,966  11/1962  Kreutzer _____ 43—4.5

OTHER REFERENCES

Modern Fishing Gear of the World, published April 1959, London, England, by Fishing News Ltd. SH i I5. Article Menhaden Purse Seining by John S. Robas, pp. 394–399, inclusive.

WARNER H. CAMP, Primary Examiner

U.S. Cl. X.R.

43—14